(12) United States Patent
Murakami (10) Patent No.: US 8,315,504 B2
(45) Date of Patent: Nov. 20, 2012

(54) REPRODUCING APPARATUS FOR REPRODUCING MOVIE DATA FROM A STORAGE MEDIUM

(75) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 12/363,516

(22) Filed: Jan. 30, 2009

(65) Prior Publication Data
US 2009/0196583 A1 Aug. 6, 2009

(30) Foreign Application Priority Data
Feb. 1, 2008 (JP) .................................. 2008-023102

(51) Int. Cl.
*H04N 5/00* (2011.01)
(52) U.S. Cl. ........................................................ 386/248
(58) Field of Classification Search .................. None
See application file for complete search history.

(56) References Cited

U.S. PATENT DOCUMENTS

| | | | | |
|---|---|---|---|---|
| 7,991,773 B2* | 8/2011 | Seo et al. | ....................... | 707/736 |
| 2004/0068606 A1* | 4/2004 | Kim et al. | ....................... | 711/100 |
| 2004/0255250 A1* | 12/2004 | Tsukamoto | ....................... | 715/723 |
| 2004/0264933 A1* | 12/2004 | Uno | ....................... | 386/95 |
| 2005/0005289 A1* | 1/2005 | Adolph et al. | ....................... | 725/32 |
| 2005/0025461 A1* | 2/2005 | Kato et al. | ....................... | 386/95 |
| 2005/0102695 A1* | 5/2005 | Musser, Jr. | ....................... | 725/34 |
| 2005/0201731 A1* | 9/2005 | Park et al. | ....................... | 386/95 |
| 2006/0204220 A1* | 9/2006 | Lee | ....................... | 386/95 |
| 2007/0248322 A1* | 10/2007 | Hamada et al. | ....................... | 386/95 |
| 2008/0065780 A1* | 3/2008 | Iwata et al. | ....................... | 709/231 |

FOREIGN PATENT DOCUMENTS

| | | |
|---|---|---|
| JP | 2002-230946 A | 8/2002 |
| JP | 2004-206742 | 7/2004 |

OTHER PUBLICATIONS

Japanese Office Action for Application No. 2008-023102 dated Jan. 10, 2012.

* cited by examiner

*Primary Examiner* — Thai Tran
*Assistant Examiner* — Sunghyoun Park
(74) *Attorney, Agent, or Firm* — Carter DeLuca Farrell & Schmidt, LLP (57) ABSTRACT

A reproducing apparatus includes a reproducing unit configured to reproduce, from a storage medium, a plurality of movie data elements, a plurality of movie information files associated with and recorded for the plurality of movie data elements, and a playlist file that indicates order in which the movie data elements are reproduced, each of the movie information files containing connection information that indicates a movie data element to be reproduced immediately after the movie data element associated with the movie information file, a control unit configured to control the reproducing unit such that the movie data elements are reproduced on the basis of the movie information files and the playlist file, and a restoring unit configured to create the playlist file on the basis of the connection information of each of the movie information files if the reproducing unit is unable to reproduce the playlist file.

8 Claims, 10 Drawing Sheets

| STREAM INFORMATION | BIT RATE | | |
| --- | --- | --- | --- |
| | ASPECT RATIO | | |
| | RESOLUTION | | |
| | SEAMLESS INFORMATION | | |
| | ⋮ | | |
| CONVERSION TABLE | 0 | PTS 0 | ADDRESS 0 |
| | 1 | PTS 1 | ADDRESS 1 |
| | 2 | PTS 2 | ADDRESS 2 |
| | ⋮ | | |
| | n | PTS n | ADDRESS n |

FIG. 4

| REPRODUCTION INFORMATION | NO. OF ITEMS |
|---|---|
| ITEM 1 | CLIP NO. |
| | CONNECTION INFORMATION |
| | REPRODUCTION START TIME |
| | REPRODUCTION END TIME |
| | THUMBNAIL NO. |
| | RECORDING DATE AND TIME |
| ITEM 2 | CLIP NO. |
| | CONNECTION INFORMATION |
| | REPRODUCTION START TIME |
| | REPRODUCTION END TIME |
| | THUMBNAIL NO. |
| | RECORDING DATE AND TIME |
| ITEM 3 | CLIP NO. |
| | CONNECTION INFORMATION |
| | REPRODUCTION START TIME |
| | REPRODUCTION END TIME |
| | THUMBNAIL NO. |
| | RECORDING DATE AND TIME |
| ⋮ | ⋮ |

| MOVIE INFORMATION FILE NO. | SEAMLESS INFORMATION |
|---|---|
| 1 | 2 |
| 2 | 3 |
| 3 | 4 |
| 4 | - |

| MOVIE INFORMATION FILE NO. | IMAGE CAPTURE DATE AND TIME INFORMATION |
|---|---|
| 1 | 01/01/2007 10:10 |
| 2 | 01/01/2007 11:11 |
| 3 | 03/03/2007 15:00 |
| 4 | 05/05/2007 8:50 |

FIG. 10

| MOVIE INFORMATION FILE NO. | SEAMLESS INFORMATION | IMAGE CAPTURE DATE AND TIME INFORMATION |
|---|---|---|
| 1 | 2 | 01/01/2007 10:10 |
| 2 | - | 01/01/2007 11:11 |
| 3 | 4 | 03/03/2007 15:00 |
| 4 | - | 05/05/2007 8:50 |

REPRODUCING APPARATUS FOR REPRODUCING MOVIE DATA FROM A STORAGE MEDIUM

BACKGROUND OF THE INVENTION

1. Field of the Invention

The present invention relates to a reproducing apparatus and, in particular, to an apparatus for reproducing movie data from a storage medium.

2. Description of the Related Art

There are apparatuses for recording movie data on and reproducing movie data from a random access medium, such as a digital versatile disk (DVD), a hard disk, or a semiconductor memory. An apparatus of this kind encodes movie data using an encoding scheme, such as moving picture experts group 2 (MPEG-2) or H.264, to compress the amount of information thereof and then records the compressed data. In reproducing the recorded movie data, the apparatus decodes the compressed movie data after reproducing the data from a storage medium. This kind of apparatus typically records the movie data as a file in accordance with a predetermined file system.

The apparatus also records information, such as the resolution, frame rate, and aspect ratio of the movie image, connection relationship to other movie data, and information associating reproduction time with information indicating an address on a storage medium, separately from the movie data. Recording information related to movie data as a file in such a way allows the apparatus to obtain the information for the movie data recorded on a storage medium before reproducing the movie data, so the apparatus can quickly start reproducing the movie image. Additionally, the apparatus can perform a special reproduction operation on the movie image, for example, fast forward reproduction.

This kind of apparatus may record one movie file and one movie information file associated with the move file for one image capture.

In this case, the movie file and the movie information file are in one-to-one correspondence. In this case, the number of movie files and the number of movie information files therefor recorded on a storage medium increase with an increase in the number of image captures.

Because various kinds of information for a movie data element are stored in a movie information file, the apparatus can achieve smooth continuous reproduction of movie data elements by reading all movie information files in advance and reproducing the movie data elements while referring to the additional information for the movie data elements.

There is a known capability of previously recording a playlist that stores order in which movie files are reproduced and the reproduction time of each of the movie files, separately from the above-described movie information files, on a storage medium and of reproducing recorded movie data in accordance with the playlist.

That is, in reproducing movie data elements in accordance with a playlist, the playlist is read from a storage medium in advance, and then a file of a movie data element specified by the playlist is read from the storage medium.

However, if the playlist is not recorded on the storage medium for some reason, a problem of lack of the order in which the movie data elements are reproduced arises.

One approach to preparing for such a case is a method for restoring the original playlist using the playlist temporarily recorded with a different file name if the playlist is lost (see, for example, Japanese Patent Laid-Open No. 2004-206742).

Unfortunately, with the method described in the above-mentioned patent document, a reproduction information file cannot be restored from a storage medium on which data is recorded in another apparatus because the playlist is recorded as a different file.

In addition, the method described in the above-mentioned patent document has a problem of necessity for an area for use in recording a different file on a storage medium.

SUMMARY OF THE INVENTION

An object of the present invention provides a technique for restoring a playlist without using special information if the playlist cannot be reproduced from a storage medium.

Further features of the present invention will become apparent from the following description of exemplary embodiments (with reference to the attached drawings).

DESCRIPTION OF THE EMBODIMENTS

Figure 1:
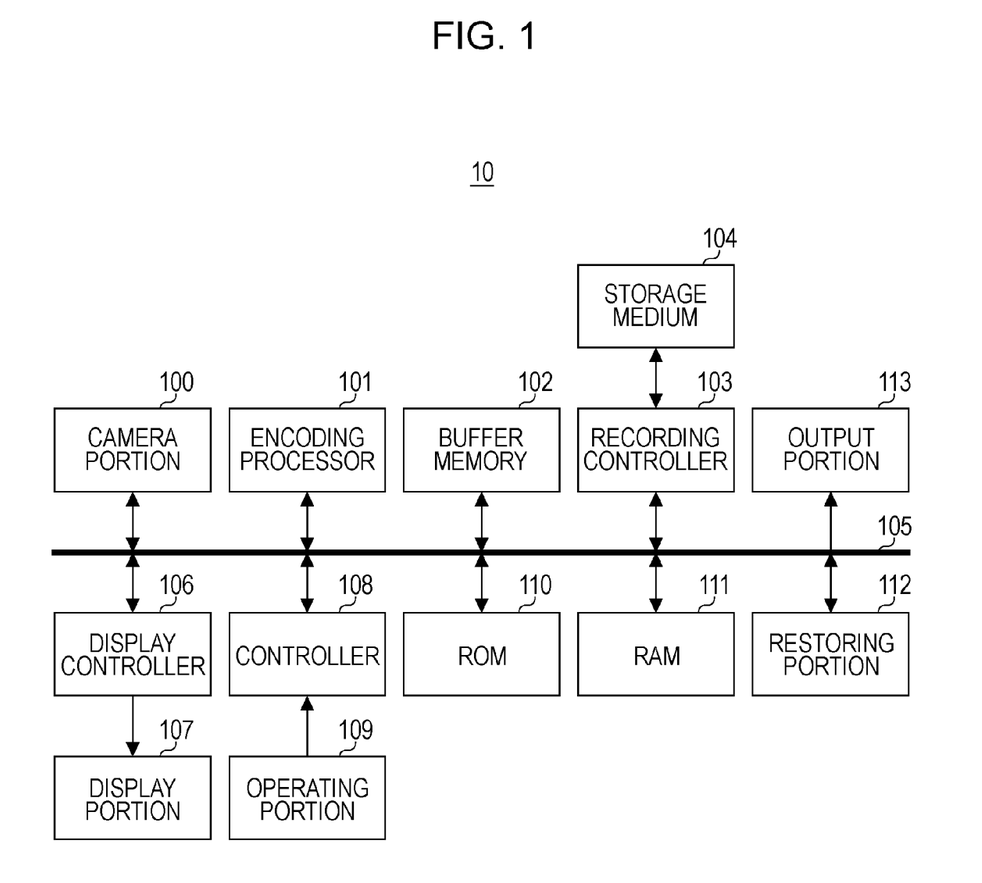
FIG. 1 is a block diagram that illustrates a configuration of a camcorder according to an embodiment of the present invention.

A first embodiment is described below with reference to the drawings. FIG. 1 is a block diagram of a camcorder 10 serving as one embodiment of the present invention.

In FIG. 1, the camcorder 10 includes a camera portion 100, an encoding processor 101, a buffer memory 102, and a recording controller 103 configured to write various kinds of data on a storage medium (disk medium) 104 and read various kinds of data therefrom. The camcorder 10 further includes a display portion 107 and a display controller 106 for displaying various kinds of data.

A controller 108 includes a microprocessor and a register and controls each block of the camcorder 10 through a bus 105. An operating portion 109 includes various kinds of switches and operation keys and transmits, to the controller 108, an input signal input in response to an operation from a user. In response to the input signal from the operating portion 109, the controller 108 controls each block and performs various kinds of processing. The controller 108 manages data to be recorded on the storage medium 104 and controls writing and reading of data executed by the recording controller 103 in accordance with a predetermined file system, which will be described below.

In the present embodiment, the storage medium 104 is an exchangeable random-access storage medium, such a digital versatile disk (DVD) or memory card. The recording controller 103 includes a mechanism for attaching the storage medium 104 to the camcorder 10 and ejecting it therefrom. The storage medium 104 is not limited to an exchangeable storage medium. The storage medium 104 can also be incorporated in the main body (housing) of the camcorder 10. In this case, a large-capacity hard disk or a semiconductor memory, such as a synchronous dynamic random access memory (SDRAM), can be used as the storage medium 104.

A read-only memory (ROM) 110 stores a program for operation of the controller 108. A random-access memory (RAM) 111 stores various kinds of data, such as movie data, a playlist, and a movie information file. A restoring portion 112 restores a playlist file, which will be described below, if the playlist file cannot be properly read from the storage medium 104. An output portion 113 outputs movie data read from the storage medium 104 by the recording controller 103.

An operation in recording movie data is described next.

The camera portion 100 includes a charge-coupled device (CCD) for converting light from an object into an electric signal and outputs an image of the object as movie data. When an instruction to start recording movie data is provided by an operation from a user, the controller 108 controls the camera portion 100 so as to temporarily store the movie data output from the camera portion 100 in the RAM 111, then sequentially read the movie data, and transmit it to the encoding processor 101. The encoding processor 101 encodes the input movie data in accordance with the MPEG system. The encoded movie data is temporarily stored in the buffer memory 102. The recording controller 103 reads the movie data from the buffer memory 102 at a predetermined timing and records it on the storage medium 104.

In the present embodiment, the movie data is stored on the storage medium (disk medium) as a file in accordance with a predetermined file system. In the present embodiment, the movie file and other files recorded on the storage medium 104 are managed in accordance with a file system, such as the publicly known universal disk format (UDF) or the file allocation table (FAT).

In recording movie data, the controller 108 obtains additional information for the movie data being recorded at a predetermined timing and stores it in the RAM 111. For example, the controller 108 can obtain the additional data every time I-picture data is created in the encoding processor 101.

The recording controller 103 is controlled such that the additional information for the movie data stored in the RAM 111 is recorded on the storage medium 104 as a movie information file after the completion of recording the movie data. The additional information and the movie information file will be described in detail below.

In such a way, the movie file and the movie information file are recorded on the storage medium 104.

In response to starting of recording movie data, the controller 108 creates representative image data using data of the leading screen of the movie data. The recording controller 103 records still image data for the representative image (hereinafter referred to as a thumbnail file) as a different file from the movie data. Reproducing the thumbnail file allows the content of a recorded movie image to be determined without reproducing the movie data.

In the present embodiment, a series of movie data recorded from the start of the recording to the end of the recording is recorded as a single movie file, and this unit is called a clip. The clip consists of two kinds of data: one is a movie file (stream file) storing a movie data element and the other is a movie information file being additional information for the movie data element.

In such a way, a movie file and a movie information file are managed on the storage medium 104 as different independent files, and these two files consisting of the movie file and the movie information file constitute a single clip. The movie file and the movie information file use the same clip number in their file names to identify their correspondence.

A single image capture (from an instruction to start image capturing to an instruction to stop the image capturing) creates a single clip (one stream file and one movie information file).

In the present embodiment, in response to recording of clips, a playlist file that specifies order in which the clips are reproduced is created, and the playlist file is recorded on the storage medium 104.

More specifically, when the storage medium 104 is attached, the controller 108 reads a playlist file recorded on the storage medium 104 through the recording controller 103 and stores it in the RAM 111.

When the recording of a movie data element of a single clip has been completed, the content of the playlist file is updated in accordance with the recorded state of the movie data element. The playlist file stored in the RAM 111 is read at a predetermined timing and recorded on the storage medium 104. The time of recording the playlist file can be, for example, the time after the completion of the recording of a single clip, the time of ejecting the storage medium 104, or the time of turning off the power of the camcorder 10.

A new playlist file is recorded on the storage medium 104 after a playlist file previously recorded on the storage medium 104 is deleted.

A playlist file describes order in which clips are reproduced as the sequence of items. Each of the items has a clip number. Reproducing the clips in the sequence of the items enables the clips existing as independent files to be reproduced in sequence.

Figure 2:
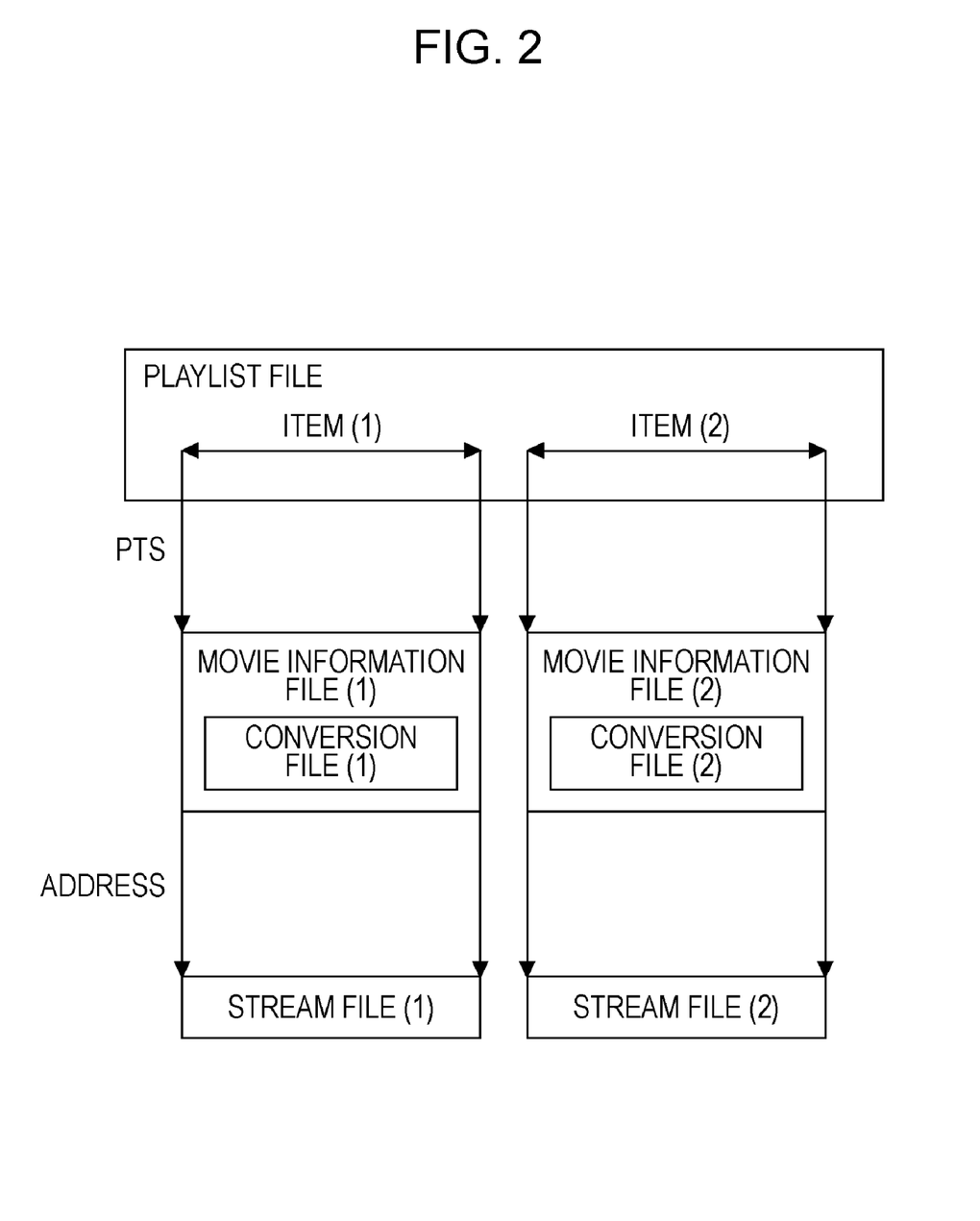
FIG. 2 illustrates a relationship among a playlist, movie information files, and movie files.

FIG. 2 illustrates a relationship among files created in the present embodiment. FIG. 2 illustrates an example in which two movie data elements are recorded and two clips are thus created. A stream file and a movie information file are in one-to-one correspondence. The stream file (1) is associated with the movie information file (1), whereas the stream file (2) is associated with the movie information file (2). The clip (1) includes the stream file (1) and the movie information file (1), whereas the clip (2) includes the stream file (2) and the movie information file (2).

As described above, a playlist file describes order in which clips are reproduced. The reproducing order is described by items, and the clips are reproduced in the sequence of the items. In the example illustrated in FIG. 2, two items are present; item (1) is associated with clip (1) and item (2) is associated with clip (2). In such a way, reproducing the sequence of item (1) and item (2) enables clip (1) and clip (2) in this order.

Each of the items has a presentation time stamp (PTS) indicating the reproduction start time and the reproduction end time together with the clip number and the reproduction start position and the reproduction end position of the clip are described therein.

In the first recording of movie data on the storage medium 104, a playlist has not yet been recorded on the storage medium 104. In this case, when the movie data is recorded on the storage medium 104 for the first time, a playlist is created in the RAM 111.

A movie information file contains information for associating a reproduction time of movie data with an address on the storage medium 104. For example, for each I-picture of movie data of the stream file (1, 2), a reproduction time and an address on the storage medium 104 are associated with each other as a conversion table (conversion file (1, 2)) illustrated in FIG. 2. The use of the conversion table can detect an address of a stream file corresponding to a reproduction time (PTS) specified by an item of a playlist file.

Figure 3:
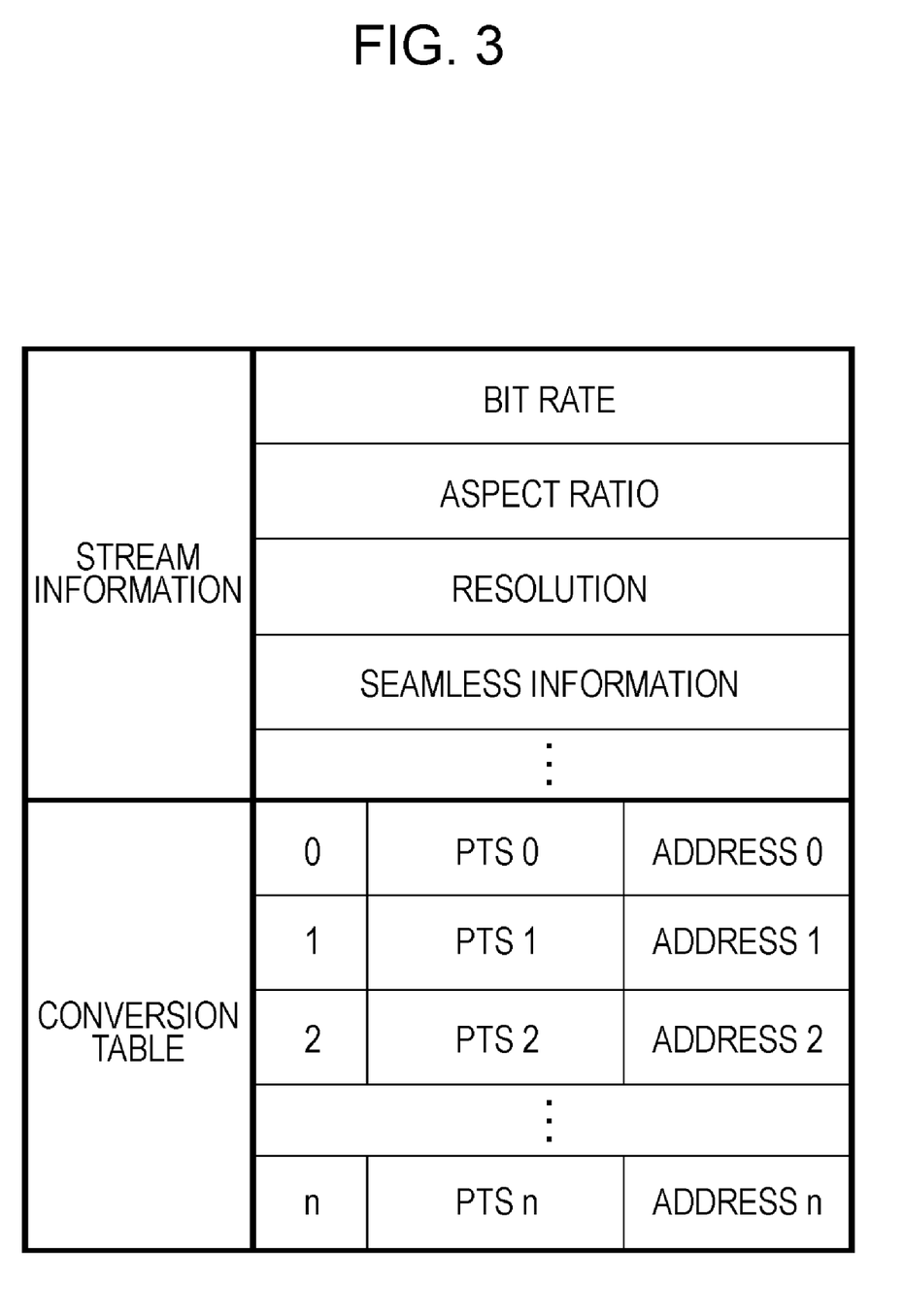
FIG. 3 illustrates an example of a configuration of a movie information file.

Another information, such as the resolution and aspect ratio of a movie image, is also recorded in a movie information file. FIG. 3 illustrates an example of a structure in a movie information file according to the present embodiment.

As illustrated in FIG. 3, the movie information file contains stream information being additional information (management information) of movie data and a conversion table. The stream information contains attribute information, such as the data rate, aspect ratio, and resolution of a movie image, and seamless information indicating a connection relationship to the next clip.

The seamless information used herein is connection-relationship information indicating that movie data elements can be continuously reproduced without a pause at the border between two adjacent movie data elements, i.e., that seamless reproduction is performable.

More specifically, when seamless reproduction is performable, information indicating the number of a clip to be reproduced next is stored. When movie data is recorded such that seamless reproduction is not allowed, a predetermined value, e.g., zero is stored.

In the present embodiment, at the stage of the completion of recording a first clip, it is unclear whether the next clip will be recorded. Thus, a predetermined value is stored as seamless information of the first clip. When the next clip is recorded such that seamless reproduction is performable, the clip number of the clip recorded next is stored as the seamless information and the movie information file of the first clip is rewritten. In the present embodiment, the file number of a movie data file for each clip is used as the clip number.

To reproduce movie data seamlessly, it is necessary to encode the movie data such that seamless reproduction is performable, in recording the movie data.

More specifically, on the basis of the amount of encoding in encoding the immediately preceding recorded movie data, the amount of encoding of movie data to be recorded is adjusted such that a buffer memory of a decoder would not suffer from underflow or overflow in decoding the recorded movie data.

In such a way, movie data is encoded in advance such that seamless reproduction is performable and then recorded. Accordingly, in continuously reproducing two movie data elements, a reproduction screen is not paused at the boarder between the two movie data elements. That is, the seamless information is also information indicating that movie data has been encoded in advance in contemplation of continuous reproduction.

In the present embodiment, in recording movie data, the movie data is always encoded such that seamless reproduction is performable. Accordingly, all movie information files except the last recorded clip contain seamless information.

If the power of the camcorder 10 is temporarily turned off and then turned on again or if the storage medium is newly attached, movie data of the last recorded clip is reproduced. On the basis of the state of the amount of encoding in several periods from the ending of the last recorded movie data, movie data to be recorded next is encoded such that seamless reproduction is performable and recorded.

The conversion table contains a reproduction time (PTS) for each I picture of a movie image and a recording position (address) on the storage medium corresponding to the I picture of the movie image. The use of the conversion table can determine the address on the storage medium from the time specified by the playlist. In the MPEG system, movie data is encoded selectively using the intra-frame coding, the predictive inter-frame coding, or the bi-directionally predictive inter-frame coding. The intra-coded frame is called I picture; the predictive-coded frame is called P picture; and the bi-directionally predictive coded frame is called B picture. In the MPEG system, encoding is performed for each unit called a group of pictures (GOP) consisting of one I picture and predetermined numbers of P and B pictures.

The MPEG system is a system that encodes predicted error between frames, so the amount of information varies among frames. In the present embodiment, the offset (recording address) from the head of the encoded movie data is detected for each I picture, and the result is recorded as the conversion table.

Figure 4:
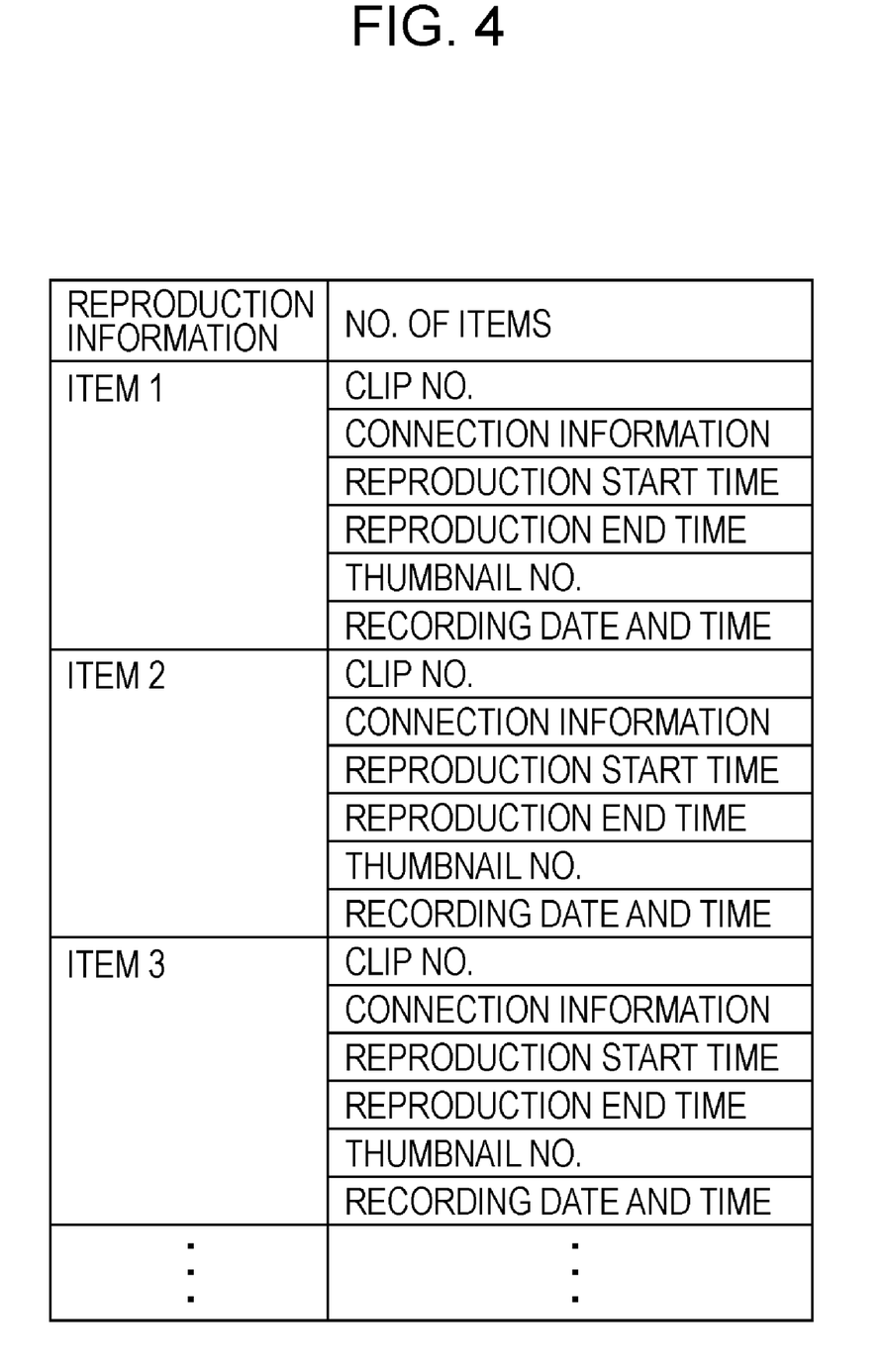
FIG. 4 illustrates an example of a configuration of a playlist file.

FIG. 4 illustrates an example of a playlist file according to the present embodiment.

As illustrated in FIG. 4, the playlist file contains information indicating reproduction order in which clips are reproduced and information indicating what part is reproduced in each clip. More specifically, for each reproduction part, the reproduction start time and the reproduction end time in each clip are described. The part from the reproduction start time to the reproduction end time is the reproduction part.

The use of the playlist file allows a user to specify reproduction order of movie data elements (clips) recorded on the storage medium 104 and a reproduction part.

In the present embodiment, however, the playlist file specifying the reproduction order and reproduction part are specified such that the recorded clips are reproduced in order of recording (chronological order of image captures) is created and recorded by the controller 108.

The number of items illustrated in FIG. 4 indicates the total number of items in the playlist. Each item stores information in the same configuration, and the information contains the clip number, connection information, reproduction start time, reproduction end time, thumbnail number, and recording date and time.

The clip number is the number of a clip to be reproduced by the item, as previously described, and indicates the file number of each of the stream file and the movie information file. The connection information is information similar to previously described seamless information contained in the movie information file and indicates that neighboring items can be continuously reproduced.

The reproduction start time and the reproduction end time represent a part to be reproduced in a clip indicated by the clip number of the item. In the present embodiment, in a playlist created in recording movie data, the whole clip is the part to be reproduced.

The thumbnail number represents the number of a previously described still image file (thumbnail file). That is, the thumbnail number functions as information indicating association of the still image file and the stream file.

As described above, in the present embodiment, the leading frame in each captured movie image is selected as a representative image and a thumbnail file is created. Reproducing the thumbnail files from the storage medium 104 and displaying them in list form on the display portion 107 allows a user to easily find a movie image that the user wants to reproduce. Additionally, there is an advantage of showing what movie images have been recorded on the storage medium 104.

An operation in reproducing movie data will be described next.

When the power is turned on through the operating portion 109 and an instruction to switch to the reproduction mode is input, the controller 108 reads a playlist file from the storage medium 104 through the recording controller 103. Then, the controller 108 reads a movie information file of a clip referred to in the playlist from the storage medium 104 and stores it in the RAM 111. In this way, previously reading the movie information file of each clip and storing the movie information files in the RAM 111 enables obtainment of information for movie data before an instruction to reproduce the clip is provided.

Accordingly, it can be determined whether data recorded on the storage medium 104 is movie data decodable by the encoding processor 101. By referring to seamless information, it can be determined whether the recorded movie data is seamlessly reproducible. The information indicating the address on the storage medium for reading each stream file is obtainable from the time specified by the playlist file.

When an instruction to start reproduction is input through the operating portion 109, the controller 108 obtains the clip number of a clip whose reproduction is indicated by the instruction and the reproduction time from among the items of the playlist. The controller 108 detects the address where the movie data is recorded on the storage medium 104 from the reproduction time of the item of the playlist using the conversion table of the movie information file corresponding to the clip number. The controller 108 controls the recording controller 103 so as to read specified movie data (stream file) from the storage medium 104.

When the reading of the movie data element indicated by one item in the playlist has been completed, the next movie data element is read from the storage medium 104 on the basis of the next item information to reproduce subsequent movie data.

In such a way, movie data elements read from the storage medium 104 are sequentially stored in the recording controller 103. The encoding processor 101 reads the movie data elements from the buffer memory 102, decodes them, and outputs them to the display controller 106 and an output portion 113. The display controller 106 displays the reproduced movie image on the display portion 107. In such a way, the camcorder 10 reproduces movie data recorded on the storage medium 104 in accordance with a playlist.

A process performed when a playlist file cannot be properly read from the storage medium 104 is described next.

As previously described, in the present embodiment, the content of a playlist is updated after movie data of a clip is recorded. Thus, if a trouble occurs, for example, if the power of the camcorder is turned off during the updating, the playlist may not be recorded properly. Another possible trouble is an inadvertent deletion of playlist data recorded on the storage medium 104 by a personal computer (PC) after the storage medium 104 is ejected from the camcorder 10.

In such cases, the playlist file cannot be properly read from the storage medium 104, so the reproduction order of movie data elements recorded on the storage medium 104 is unknown. Thus, the present embodiment has a configuration of restoring a playlist file if the playlist cannot be properly read from the storage medium 104.

Figure 11:
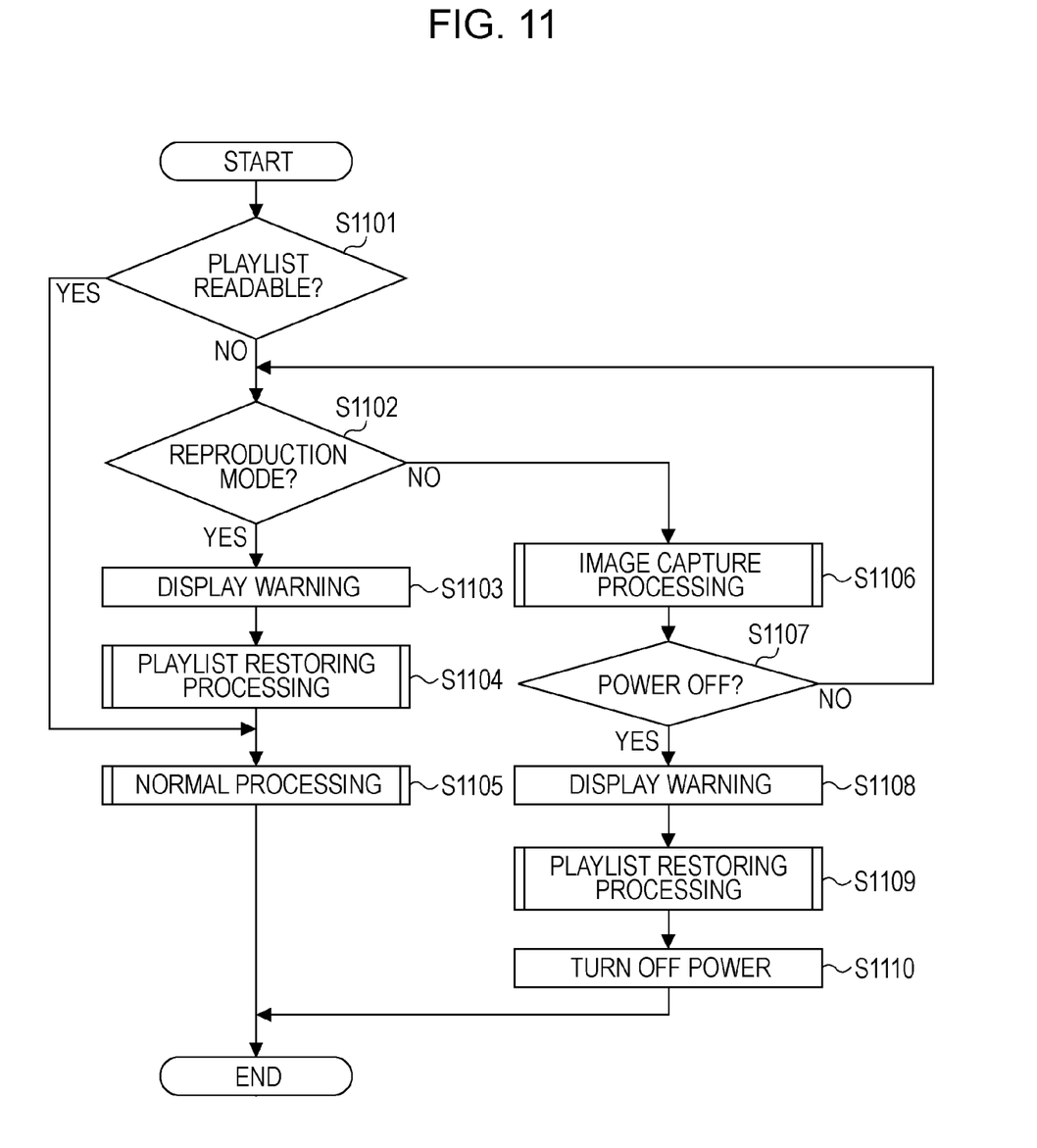
FIG. 11 is a flowchart that illustrates a process performed by a camcorder.

FIG. 11 is a flowchart that illustrates an operation of the camcorder 10, the operation containing a process for restoring a playlist file. The processing illustrated in FIG. 11 is achieved by the controller 108 controlling each portion.

When the power of the camcorder 10 is turned on while the storage medium 104 is attached therein or when the storage medium 104 is newly attached in the camcorder 10 while the power is on, the flow illustrated in FIG. 11 begins.

First, the playlist file is read from the storage medium 104 and is stored in the RAM 111. Then, it is determined whether the playlist file is properly readable in step S1101. When the playlist is properly read (YES in step S1101), flow proceeds to step S1105, where normal image capturing or reproducing is performed, as previously described.

When the playlist cannot be properly read (NO in step S1101), it is determined whether the camcorder 10 is set at the reproduction mode in step S1102. In the present embodiment, the camcorder 10 is operable in the recording mode at which a movie image is captured and recorded on the storage medium 104 and in the reproduction mode at which movie data is reproduced from the storage medium 104. When the power is turned on, the camcorder 10 is automatically in the recording mode. After that, when an instruction to switch to the reproduction mode is provided from a user, the recording mode is switched to the reproduction mode.

When the reproduction mode has been set (YES in step S1102), a warning that the playlist cannot be properly reproduced is displayed on the display portion 107 in step S1103 and a process for restoring the playlist file is performed in step S1104.

Figure 5:
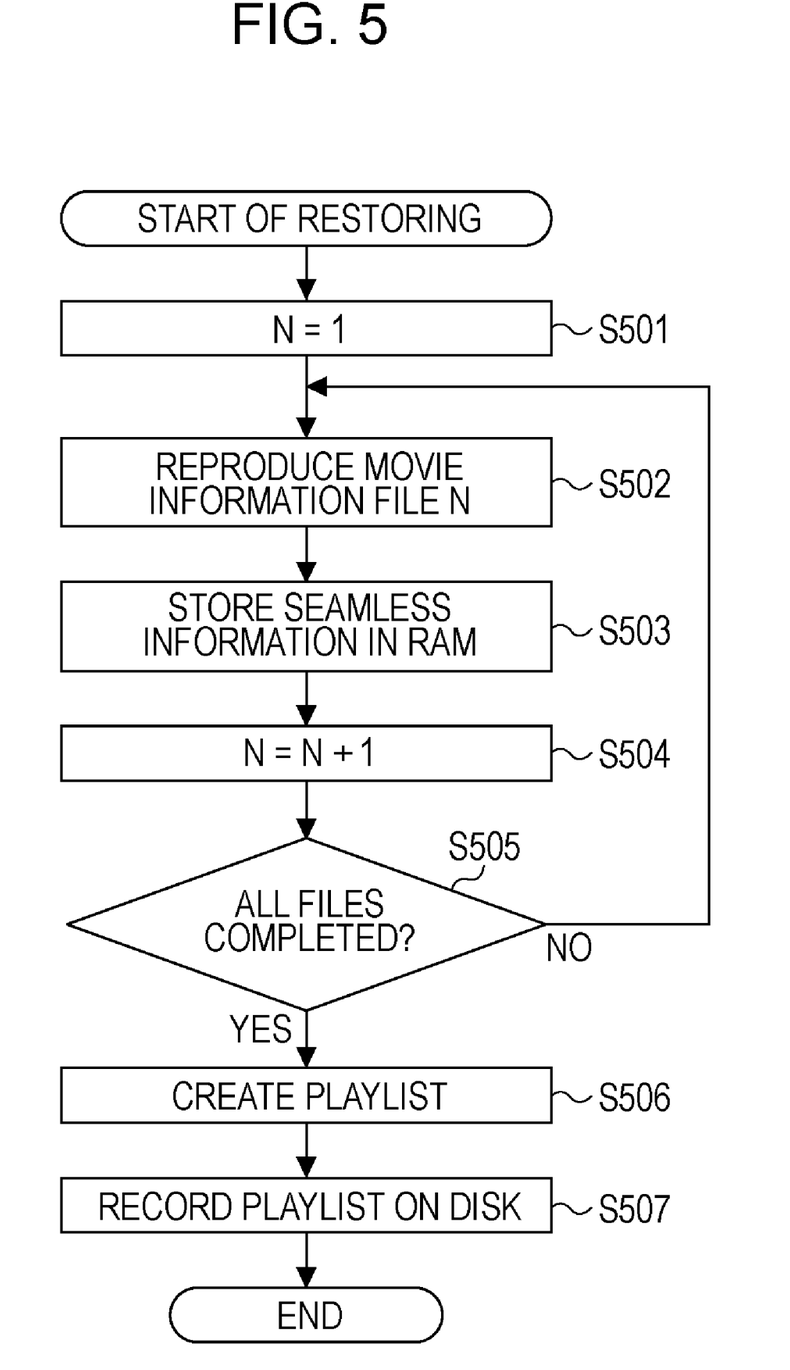
FIG. 5 is a flowchart that illustrates a process for restoring a playlist.

FIG. 5 is a flowchart that illustrates the process for restoring the playlist file in step S1104. The processing illustrated in FIG. 5 is also controlled by the controller 108 controlling each portion.

First, in step S501, the restoring portion 112 initializes the variable N used for reading movie information files in order of file numbers as N=1. In the present embodiment, the description is provided on the assumption that the movie information files have file numbers (file names) in descending order from one.

In step S502, the n-th movie information file is read from the storage medium 104 and is stored in the RAM 111. Then, the restoring portion 112 detects seamless information from the movie information file stored in the RAM 111.

In step S503, the restoring portion 112 stores the detected seamless information in the RAM 111 as a separate seamless information table. Then, in step S504, the restoring portion 112 adds one to the variable N used for reproducing the movie information files in order of their file numbers.

In step S505, the restoring portion 112 determines whether all movie information files recorded on the storage medium 104 have been checked. When not all of the movie information files have been checked (NO in step S505), flow returns to step S502, where the n-th movie information file is checked. When all of the movie information files have been checked (YES in step S505), the playlist is created on the basis of the seamless information stored in the RAM 111 in step S506.

Figure 6:
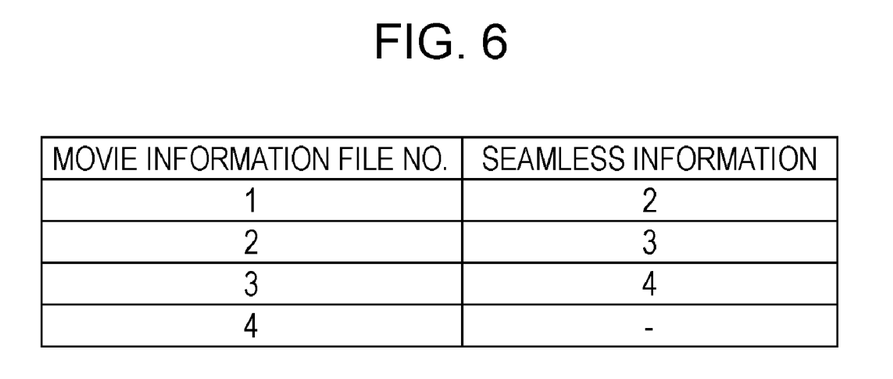
FIG. 6 illustrates an example of a seamless information table.

For example, when four movie information files are recorded on the storage medium 104 and each of the four movie information files has information indicating that seamless reproduction is performable, the seamless information table illustrated in FIG. 6 is stored in the RAM 111. It is noted that the fourth movie information file has no seamless information because it has no subsequent clip.

Figure 7A:
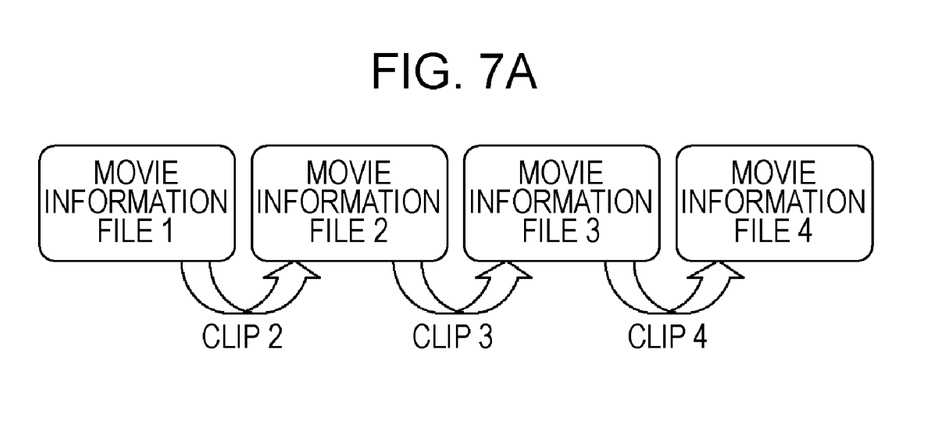
FIGS. 7A and 7B are illustrations that describe how a playlist is restored using seamless information.
Figure 7B:
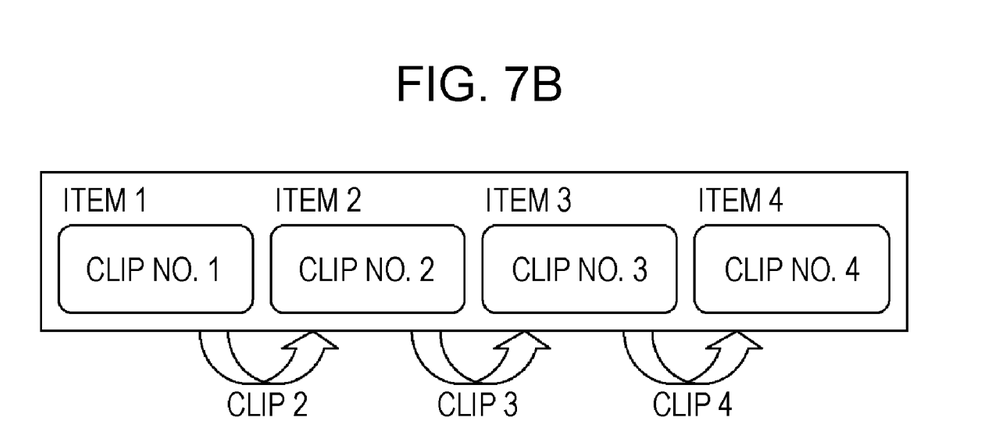

The restoring portion 112 creates the playlist on the basis of the seamless information table stored in the RAM 111. FIGS. 7A and 7B illustrate an example of a relationship between a seamless information table and a playlist. For example, the connection relationship between the movie information files specified the seamless information table illustrated in FIG. 6 is illustrated in FIG. 7A. FIG. 7A shows that the movie data elements are recorded in order of the clip 1 (movie information file 1), clip 2 (movie information file 2), clip 3 (movie information file 3), and clip 4 (movie information file 4) because stream files and movie information files are in one-to-one correspondence.

As illustrated in FIG. 7B, the restoring portion 112 creates a playlist that has items 1 to 4 and that enables reproduction of the clips 1 to 4 in this order.

In step S507, the playlist created in such a way is recorded on the storage medium 104 through the recording controller 103.

Through the above steps, the playlist can be restored using the seamless information in the movie information file.

Referring back to FIG. 11, when the playlist file is restored in the above-described way and recorded on the storage medium 104, flow proceeds to step S1105, where normal processing is performed.

When the reproduction mode has not been set (NO in step S1102), flow proceeds to step S1106, where image capturing is performed, as previously described.

In step S1107, it is determined whether an instruction to turn off the power has been provided. When no instruction to turn off the power has been provided (NO in step S1107), flow returns to step S1102. When the instruction to turn off the power has been provided (YES in step S1107), a warning indicating that the playlist file cannot be properly reproduced is displayed on the display portion 107 in step S1108, similar to step S1103. Then, in step S1109, the process for restoring the playlist file illustrated in FIG. 5 is performed. When the restoring and recording of the playlist file has been completed, the power of the camcorder 10 is turned off in step S1110 and the processing ends.

As described above, in the present embodiment, the playlist file is restored on the basis of the seamless information in the movie information file.

Accordingly, the playlist can be restored without recording of special information, such as a backup file of the playlist. Additionally, a storage area for recording a backup file is unnecessary. Even if the playlist cannot be properly reproduced, the playlist for enabling movie data elements to be reproduced in order in which the movie data elements were recorded can be created.

In the present embodiment, the process for restoring the playlist file is performed after the warning is displayed in step S1103 or S1108. Unfortunately, the creation of the playlist may take much time.

To address this, a screen for inquiring of a user whether the playlist file is to be restored may be displayed after the warning is displayed, and the playlist file may be restored when the user provides an instruction to restore the playlist file.

A second embodiment of the present invention is described next.

In the present embodiment, if a playlist file cannot be properly reproduced from a storage medium, the playlist file is restored on the basis of information indicating image capture date and time (recording date and time information). The configuration of the camcorder in the present embodiment is substantially the same as that in the first embodiment, so the description thereof is not repeated here.

In the present embodiment, in recording movie data, the controller 108 detects information indicating recording date and time output from a clock unit (not shown). The controller 108 controls the recording controller 103 such that the information indicating the recording date and time is stored in the movie information file and the movie information file is recorded.

Figure 8:
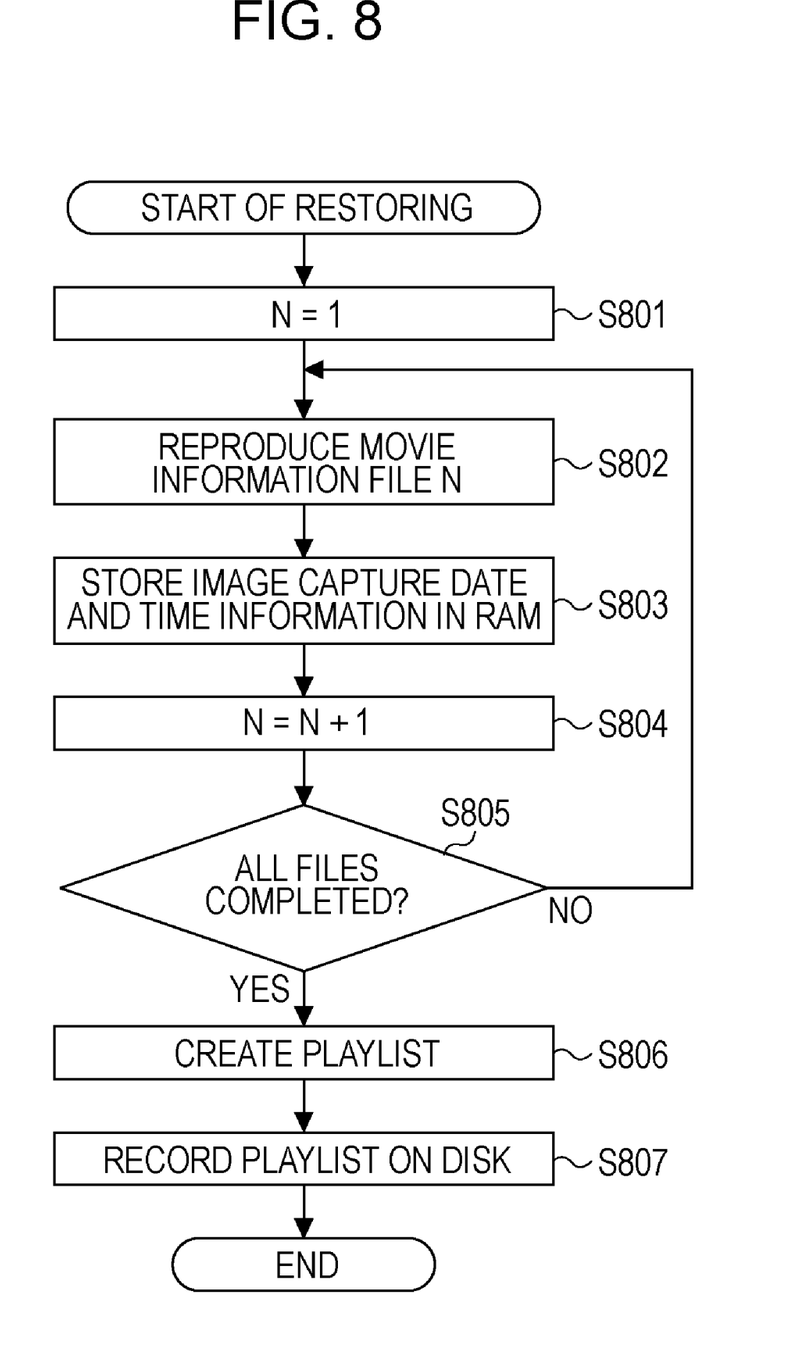
FIG. 8 is a flowchart that illustrates another process for restoring a playlist.

FIG. 8 is a flowchart that illustrates a process for restoring a playlist according to the present embodiment. The processing illustrated in FIG. 8 is performed in the process for restoring a playlist in step S1104 or S1109 illustrated in FIG. 11.

First, in step S801, the restoring portion 112 initializes the variable N used for reading movie information files in order of file numbers as N=1. In the present embodiment, the description is provided on the assumption that the movie information files are numbered in descending order from one.

In step S802, the n-th movie information file is read from the storage medium 104 and is stored in the RAM 111. Then, the restoring portion 112 detects information indicating the image capture date and time from the movie information files stored in the RAM 111.

In step S803, the restoring portion 112 stores the detected information indicating the image capture date and time in the RAM 111 as a separate image capture date and time information table. Then, in step S804, the restoring portion 112 adds one to the variable N used for accessing the movie information files in order of their file numbers.

In step S805, the restoring portion 112 determines whether the image capture date and time information stored in all movie information files recorded on the storage medium 104 has been detected. When not all of the image capture date and time information stored in the movie information files has been detected (NO in step S805), flow returns to step S802, where the n-th movie information file is read.

When all the image capture date and time information stored in the movie information files have been detected (YES in step S805), the playlist is created in step S806.

Figure 9:
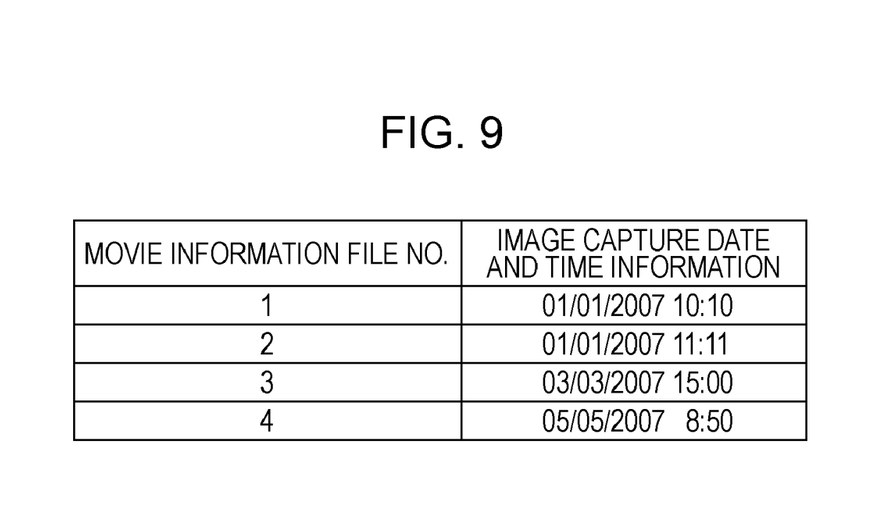
FIG. 9 illustrates an example of an image capture date and time table.

For example, when four movie information files have been recorded on the storage medium 104, the image capture date and time information table illustrated in FIG. 9 is created by the previously described process.

The restoring portion 112 creates the playlist on the basis of the image capture date and time information table stored in the RAM 111. For example, the image capture date and time information table illustrated in FIG. 9 shows the order in which the clips were recorded. The playlist is created that has items 1 to 4 and that specifies the order in which the clips are reproduced such that the clips 1 to 4 are reproduced in sequence.

In step S807, the playlist created in such a way is recorded on the storage medium 104 through the recording controller 103.

Through the above steps, the playlist can be restored using the image capture date and time information in the movie information file.

If the image capture date and time information is not contained in the movie information file, information indicating file creation date and time recorded by a file system in recording each file can also be employed. A thumbnail number in the playlist can also be restored simultaneously with the restoring of the playlist file from comparison between the creation date and time information for the movie information file and the creation date and time information for the thumbnail file. Restoring thumbnail numbers in a playlist enables representative images (thumbnail images) to be displayed in list form in order in which the items in the playlist are reproduced.

As described above, in the present embodiment, the playlist file is restored on the basis of the image capture date and time information in the movie information file.

Accordingly, the playlist can be restored without recording of special information, such as a backup file of the playlist.

Additionally, a storage area for recording a backup file is unnecessary. Even if the playlist cannot be properly reproduced, the playlist for enabling movie data elements to be reproduced in order in which the movie data elements were recorded can be created.

A third embodiment of the present invention is described next.

In the first embodiment, in recording movie data, the movie data is always encoded such that seamless reproduction is performable.

To enable seamless reproduction, it is necessary to execute encoding such that the buffer memory would not suffer from overflow or underflow when movie data to be recorded this time is reproduced subsequently to immediately preceding movie data.

That is, if the amount of encoding of the immediately preceding recorded movie data is large, it is necessary to reduce the amount of encoding of the movie data to be recorded this time. For this reason, the image quality may be degraded.

To address this, in the present embodiment, encoding that enables seamless reproduction is not always performed, and a user can select whether to record a movie image such that seamless reproduction is performable.

Accordingly, in the present embodiment, both movie data that allows seamless reproduction and movie data that does not allow seamless reproduction are recorded in the storage medium 104.

Because a movie information file of a clip in which seamless reproduction is not allowed has no seamless information, a connection relationship for the clip is unknown.

To address this, in the present embodiment, the processes for restoring a playlist described in the first and second embodiments are combined to restore a playlist.

Figure 12:
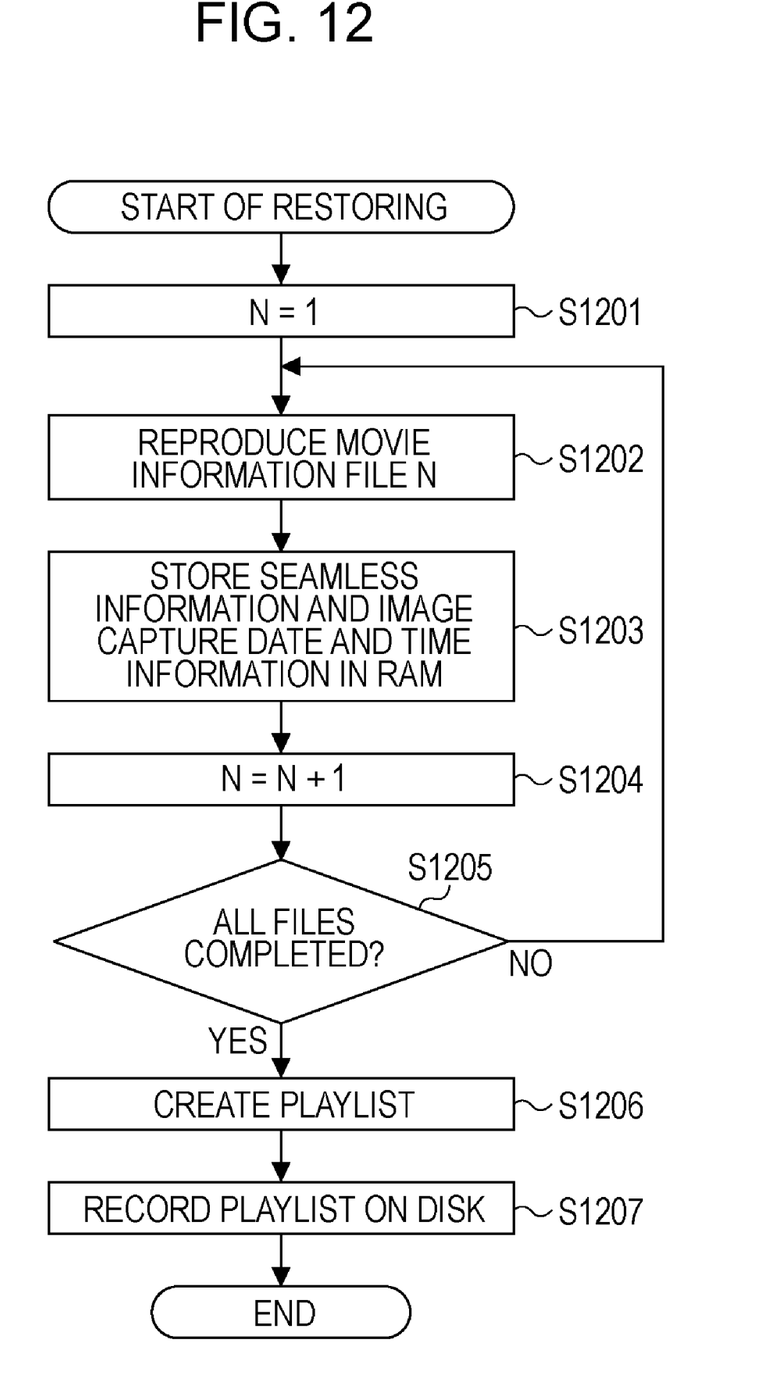
FIG. 12 is a flowchart that illustrates still another process for restoring a playlist.

FIG. 12 is a flowchart that illustrates a process for restoring a playlist according to the present embodiment. The processing illustrated in FIG. 12 is performed in the process for restoring a playlist in step S1104 or S1109 illustrated in FIG. 11.

First, in step S1201, the restoring portion 112 initializes the variable N used for reading movie information files in order of file numbers as N=1. In the present embodiment, the description is provided on the assumption that the movie information files are numbered in descending order from one.

In step S1202, the n-th movie information file is read from the storage medium 104 and is stored in the RAM 111. Then, the restoring portion 112 detects seamless information and information indicating the image capture date and time from the movie information file stored in the RAM 111.

In step S1203, the restoring portion 112 stores the detected seamless information and information indicating the image capture date and time in the RAM 111 as a separate restoring information table. As previously described, there may be a movie information file that contains no seamless information. In this case, seamless information is not stored. Then, in step S1204, the restoring portion 112 adds one to the variable N to access the movie information files in order of their file numbers.

In step S1205, the restoring portion 112 determines whether the seamless information and the image capture date and time information stored in all movie information files recorded on the storage medium 104 has been detected. When not all of the seamless information and image capture date and time information stored in the movie information files have been detected (NO in step S1205), flow returns to step S1202, where the n-th movie information file is read.

When all the seamless information and the image capture date and time information stored in the movie information files have been detected (YES in step S1205), the playlist is created in step S1206.

Figure 10:
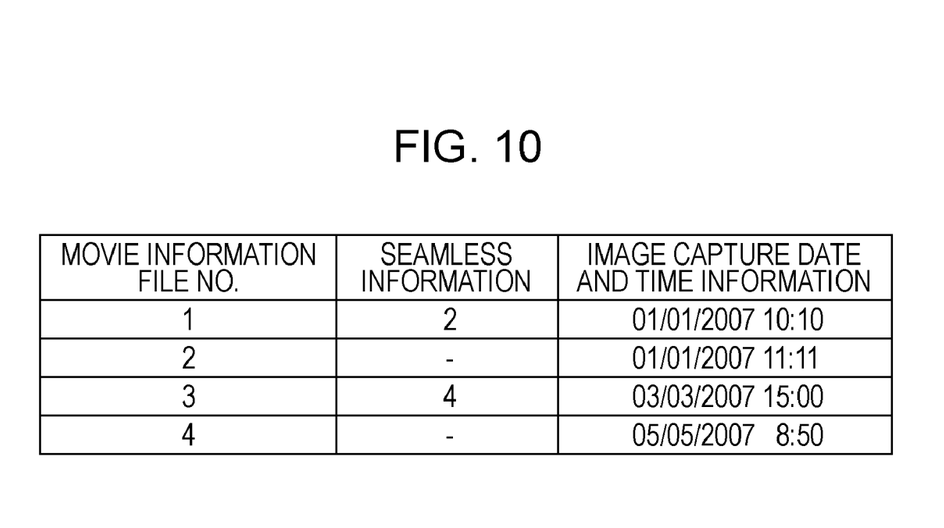
FIG. 10 illustrates an example of a recovery information table.

For example, when four movie information files have been recorded on the storage medium 104, the restoring information table illustrated in FIG. 10 is created by the previously described process.

The restoring portion 112 creates the playlist on the basis of the restoring information table stored in the RAM 111. At this time, the playlist can be created in a similar way to that in the first embodiment or second embodiment.

In step S1207, the restored playlist is recorded on the storage medium 104.

In the present embodiment, the order in which movie data elements are reproduced is first determined on the basis of seamless information. If no such seamless information exists (seamlessly recording has not been performed), because a connection relationship of that part is unknown, the connection relationship of that part is determined on the basis of the image capture date and time information.

Through the above processing, the playlist file can be restored on the basis of the seamless information and the image capture date and time information.

After the playlist is created in this way, the playlist file is recorded on the storage medium 104.

As described above, in the present embodiment, the playlist file is restored on the basis of the seamless information and the image capture date and time information in the movie information file.

Accordingly, the playlist can be restored without recording of special information, such as a backup file of the playlist. Additionally, a storage area for recording a backup file is unnecessary. Even if the playlist cannot be properly reproduced, the playlist for enabling movie data elements to be reproduced in order in which the movie data elements were recorded can be created.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-023102 filed Feb. 1, 2008, which is hereby incorporated by reference herein in its entirety.

What is claimed is:

1. A reproducing apparatus comprising:
    a reproducing unit configured to reproduce, from a storage medium, a plurality of movie data elements, a plurality of movie information files associated with and recorded for the plurality of movie data elements, and a playlist file that indicates order in which the plurality of movie data elements are reproduced,
    wherein each of the plurality of movie information files contains connection information that indicates a movie data element to be reproduced next to the movie data element associated with the movie information file and indicates that the next movie data element can be reproduced seamlessly;
    a control unit configured to control the reproducing unit on the basis of the plurality of movie information files and the playlist file reproduced by the reproducing unit,
    wherein, if it is indicated by the connection information that the next movie data element determined based on the order indicated by the playlist file can be reproduced seamlessly, the control unit controls the reproducing unit to reproduce the determined next image data element seamlessly;

a restoring unit configured to create the playlist file on the basis of the connection information of each of the plurality of movie information files reproduced by the reproducing unit if the reproducing unit is unable to reproduce the playlist file; and a recording unit configured to record the playlist file created by the restoring unit on the recording medium.

2. The reproducing apparatus according to claim 1, wherein the plurality of movie data elements is encoded, and the connection information is information indicating that the plurality of movie data elements have been encoded such that a buffer memory of a decoder for decoding the plurality of movie data elements prevents overflow or underflow at a border between two movie data elements of the plurality of movie data elements in decoding the plurality of movie data elements.

3. The reproducing apparatus according to claim 1, wherein the playlist file specifies the order in which the plurality of movie data elements are reproduced such that the plurality of movie data elements are reproduced in order in which the plurality of movie data elements were recorded on the storage medium.

4. The reproducing apparatus according to claim 1, wherein the restoring unit is configured to create the playlist file specifying the order in which the plurality of movie data elements are reproduced such that plurality of movie data elements are reproduced in order in which the plurality of movie data elements were recorded on the storage medium, on the basis of the connection information of each of the plurality of movie information files.

5. The reproducing apparatus according to claim 1, wherein each of the plurality of movie information files contains recording date and time information for the movie data element associated with the movie information file, and the restoring unit is configured to create the playlist file on the basis of the recording date and time information of the movie information file.

6. A recording and reproducing apparatus comprising:

a recording unit configured to record a movie data element on a storage medium;

a movie information file creating unit configured to create a movie information file for each of a plurality of movie data elements recorded on the storage medium, each of the movie information files containing connection information indicating a movie data element to be reproduced next to the movie data element associated with the movie information file and indicates that the next movie data element can be reproduced seamlessly;

a playlist creating unit configured to create a playlist file specifying order in which the plurality of movie data elements recorded on the storage medium are reproduced such that the plurality of movie data elements are reproduced in order in which the plurality of movie data elements were recorded on the storage medium;

a control unit configured to control the recording unit such that the plurality of movie information files and the playlist file are recorded on the storage medium in accordance with recording of the plurality of movie data elements;

a reproducing unit configured to reproduce the plurality of movie data elements, the plurality of movie information files, and the playlist file from the storage medium, wherein if it is indicated by the connection information that the next movie data element determined based on the order indicated by the playlist file can be reproduced seamlessly, the control unit controls the reproducing unit to reproduce the determined next image data element seamlessly; and a restoring unit configured to create the playlist file on the basis of the connection information of each of the plurality of movie information files reproduced by the reproducing unit if the reproducing unit is unable to reproduce the playlist file, wherein the recording unit records the playlist file created by the restoring unit on the recording medium.

7. The recording and reproducing apparatus according to claim 6, wherein the recording unit is configured to record a representative image data element of each of the plurality of movie data elements and recording date and time information for the representative image data element on the storage medium, and the restoring unit is configured to create the playlist file on the basis of the recording date and time information for the representative image data element.

8. The recording and reproducing apparatus according to claim 6, further comprising a setting unit configured to set a mode at either one of a recording mode and a reproduction mode, wherein the restoring unit is configured to create the playlist file in response to setting of the mode at the reproduction mode performed by the setting unit.

* * * * *